Nov. 23, 1937.  A. KENDZIERSKI  2,099,895
DEMOUNTABLE TIRE RIM
Filed June 12, 1936   3 Sheets—Sheet 1

Inventor

A. Kendzierski

By *Clarence A. O'Brien* and
*Hyman Berman*
Attorneys

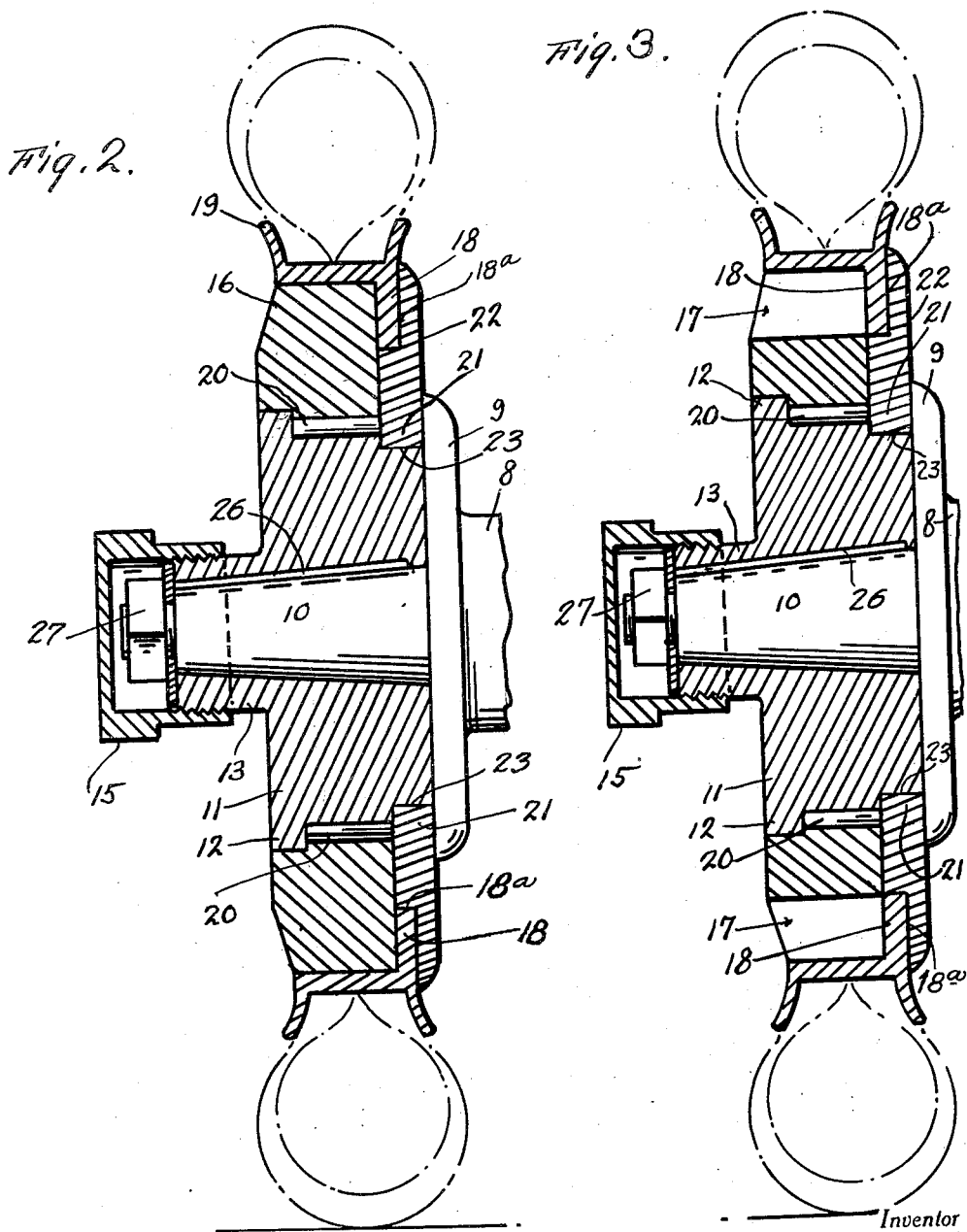

Nov. 23, 1937.  A. KENDZIERSKI  2,099,895
DEMOUNTABLE TIRE RIM
Filed June 12, 1936  3 Sheets-Sheet 3

Inventor.
A. Kendzierski
By Clarence A. O'Brien and
Hyman Berman
Attorneys

Patented Nov. 23, 1937

2,099,895

UNITED STATES PATENT OFFICE 2,099,895

DEMOUNTABLE TIRE RIM

Andrew Kendzierski, Buffalo, N. Y.

Application June 12, 1936, Serial No. 84,960

3 Claims. (Cl. 301—11)

This invention relates to that classification of structures embodying demountable tire and wheel rims and has reference in particular to a quick applicable and removable tire rim and a special wheel structure and mounting expressly constructed therefor.

In reducing the principles of the present inventive conception to practice I have evolved and produced a novel wheel and rim assemblage of a so-called rotary dial type designed to facilitate placement and removal of the tire equipped rim and satisfactorily made to insure positive driving maintenance of the tire and rim.

Briefly, the preferred embodiment of the invention comprises a sectional wheel and rim assembly characterized by a special lug equipped tire accommodation rim, adapter means for the lugs on the rim, and an oscillatory annulus or ring for clamping the rim in place through the instrumentality of the lug and adapter and supporting means.

Manifestly, it is the chief aim of the invention to generally improve upon marketed and prior art devices by perfecting an arrangement which adapts the lug equipped tire carrying rim for bodily application and removal through the instrumentality of properly selected and appropriately matched mounting and clamping means.

Other features and advantages will become more readily apparent from the following description and the accompanying illustrative drawings.

In the drawings wherein like numerals are employed to indicate corresponding details throughout the views:—

Figure 2 is a central vertical sectional view taken approximately on the plane of the line 2—2 of Figure 1 looking in the direction of the arrows and showing the rim locked or clamped in place ready for use.

Figure 3 is a view based on Figure 2 and showing the rotary dial-type annulus adjusted or turned to a position to bring the clearance notches into position to facilitate extraction of the lugs and removal of the rim.

Figure 1:
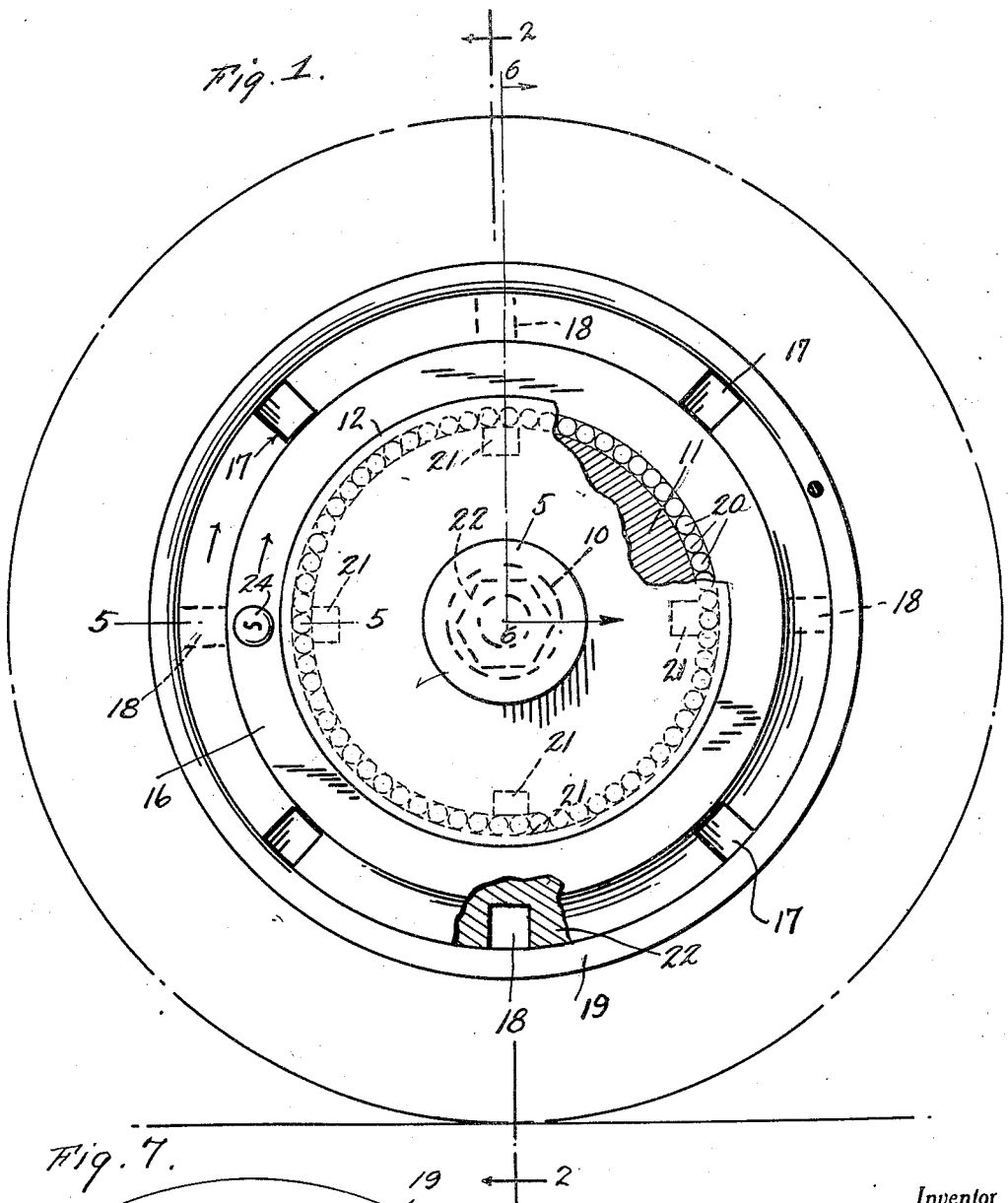
Figure 1 is an outside elevational view of a wheel and rim assembly constructed in accordance with my inventive conception, certain features being denoted with dotted lines, and certain portions being broken away and shown in section.

Attention is invited now to Figure 2 wherein will be observed that the numeral 8 designates the axle, the numeral 9 the axle flange, and the numeral 10 the tapered extension. The wheel hub is distinguished by the numeral 11 and is keyed on the extension 10 in abutting relation with the flange 9. The hub includes a cylindrical body portion having, at its outer side, an outstanding stop flange 12. Projecting centrally beyond the flange 12 is a clamping neck 13 screw threaded as at 14 to accommodate the nut enclosing and protecting cap 15.

Fitted over the cylindrical hub member 11 and abutting the flange 12 is the annulus 16. This annulus is provided with four circumferentially spaced equidistant clearance notches 17 to permit passage therethrough of the correspondingly positioned lugs 18 on the tire rim 19. The annulus 16 functions as a sort of a dial as well as a clamping member and its outer periphery is fashioned to properly seat the web portion of the rim 19. The thickness of the outer periphery is such as to permit the inwardly offset retaining lugs 18 to contact the inner surface of said annulus as indicated in Figure 2. In practice, the outer visible face of the annulus as well as the flange 12 may be provided with coinciding graduations (not shown) to show the distance of rotation of the annulus to either align or disalign the clearance notches 17 with the lugs 18 on the rim. To facilitate rotary movement of the dialing and clamping annulus I interpose anti-friction rollers 20 between the inner surface of the annulus and the periphery of the cylindrical body 11 of the wheel hub.

The portion 11 of the hub is provided with circumferentially spaced keying notches 23 to accommodate keys 21 (see Figure 7) on the inner periphery of the adapter and abutment ring 22. The outer marginal edge of the abutment ring 22 is provided with equidistant circumferentially spaced keeper notches 18a to accommodate and hold in place the lugs 18 of the rim 19.

Figure 7:
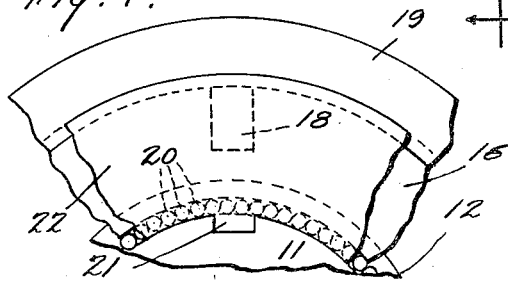
Figure 7 is a fragmentary inside elevational view showing the key connection between the inner abutment or adapter ring and the supporting hub, other portions being shown progressively in stepped relationship to illustrate the general assembly with requisite completeness.
Figure 4:
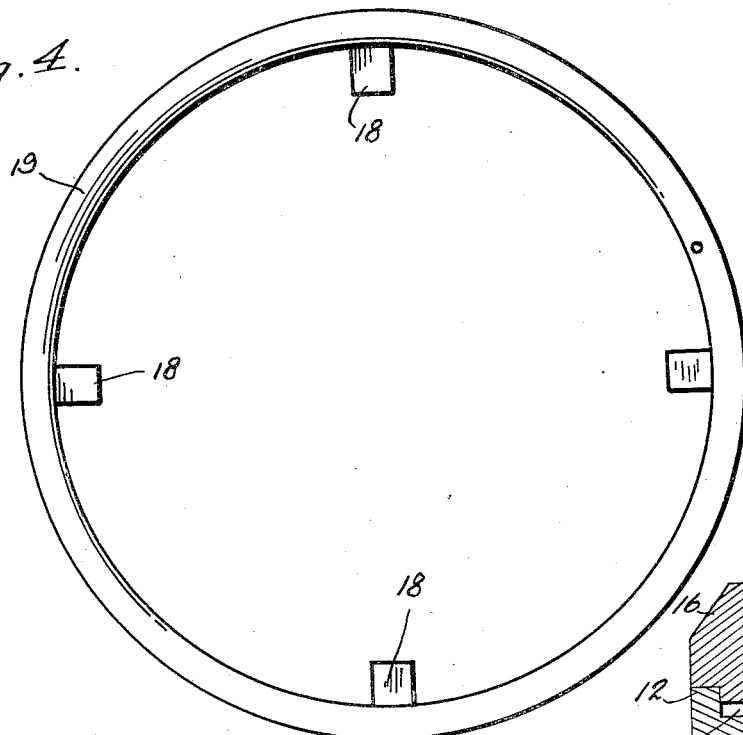
Figure 4 is a detail view of the rim per se.

In practice, the annulus 16 is first assembled on the cylindrical portion of the hub 11 by slipping it on in a direction from right to left, after which it is brought into rotary contact with the retaining flange 12. The anti-friction rollers are interposed between the adjacent peripheral surfaces of the annulus 16 and hub 11. Then the abutment ring 22 which constitutes the adapter means, is slipped over the hub in contact with the annulus and serves to hold the roller bearings in place. As shown in Figure 7, the keys 21 slip into the notches 23 in the hub and the entire assembly, as a unit is fitted keyed as at 26 on the axle extension and held in place by a clamping nut 27 as shown in Figures 2 and 3.

By properly turning the clamping annulus 16, the notches 17 can be brought into registry with the keeper notches 18a (Figs. 2 and 3) in the abutment ring 22. Then the lugs 18 on the rim 19 can be matched with these aligning notches 17 and slipped easily into place. As before indicated, the rim 19 fits around the outer periphery of the annulus 16 and the lugs 18 thereon slip through and beyond the notches 17 and seat themselves in the keeper notches 18a in the abutment ring 22. By turning the annulus and disaligning the notches 17 with the lugs 18, the annulus then becomes a clamping and retaining member for said lugs 18 holding the rim securely in place. This is brought out in Figure 1 of the drawings. As before indicated the hub member and annulus may be provided with suitable graduations to show just how far it is necessary to turn the annulus to either clamp or release the tire holding rim.

Figure 5:
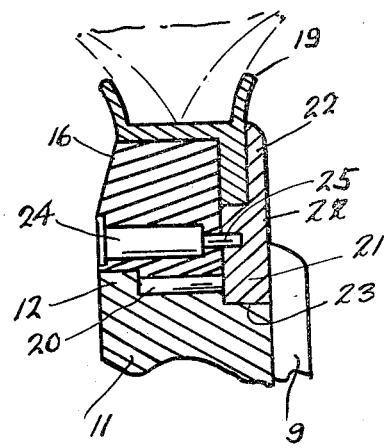
Figure 5 is a fragmentary detail sectional view showing the key controlled lock for the relatively rotatable or oscillatory annulus, the section being on the line 5—5 of Figure 1.
Figure 6:
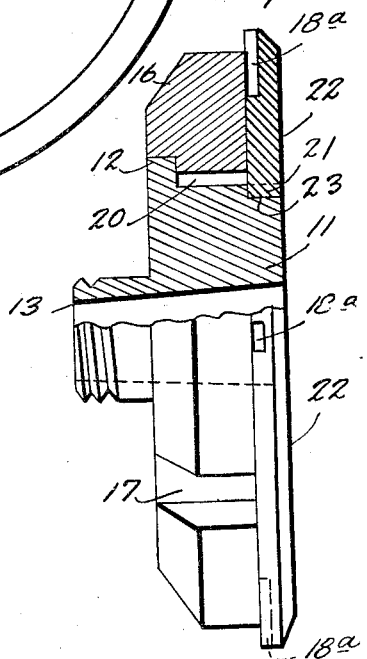
Figure 6 is a detail view of the structure with the tire and rim removed, said view being partly in section and partly in elevation, of a fragmentary character with the sectional portion thereof broken away approximately on the plane of the line 6—6 of Figure 1.

In order to secure the annulus in place, a suitable key controlled lock 24 is provided as shown in Figure 5, said lock being carried by the annulus and including a projectable locking pin or bolt 25 to fit into a socket in the abutment ring 22. With the parts thus locked together the rim is clamped in place and the hub, annulus, abutment ring 22 and rim 19 are properly assembled for driving connection.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described the invention, what is claimed is:—

1. In a structure of the class described, a cylindrical hub member provided adjacent its outer face with an outstanding stop flange, an annulus fitted over said hub, abutting and surrounding said flange, said annulus being provided with marginal lug accommodation notches, anti-friction rollers interposed between the annulus and hub, an abutment ring surrounding said hub and keyed thereto and abutting said annulus, said abutment ring being provided with keeper notches with which the notches in said annulus may be registered or disaligned at will.

2. In a demountable tire rim assemblage of the class described, a relatively fixed cylindrical hub member provided on its peripheral portion and adjacent its outer face with a radial outstanding endless stop flange, an abutment ring surrounding the peripheral portion of said hub member and projecting radially therebeyond and disposed in spaced parallelism to said stop flange, said abutment ring constituting a tire rim abutment and retention element and being formed in its outer face with marginally arranged circumferentially spaced keeper notches, said abutment ring being fixedly keyed on said hub member and forming between itself and said stop flange an annular raceway, an annulus surrounding said hub member and having one side thereof in rotating contact with the adjacent face of said abutment ring, said annulus being provided in its outer peripheral edge with lug accommodation notches selectively registerable with said keeper notches, the inner edge portion of said annulus projecting into said raceway and having rotating contact with the adjacent face of said stop flange, and a plurality of anti-friction rollers located in the raceway and interposed between the inner surface of the annulus and adjacent periphery of said hub member.

3. In a demountable tire rim assemblage of the class described, a relatively fixed cylindrical hub member provided on its peripheral portion and adjacent its outer face with an outstanding endless stop flange, an abutment ring surrounding the peripheral portion of said hub member and projecting radially therebeyond and disposed in spaced parallelism to said stop flange, said abutment ring consisting a tire rim stop and retention element and being formed in its outer face with marginally arranged circumferentially spaced keeper notches, said abutment ring being fixedly keyed on said hub member and forming between itself and said stop flange an annular raceway, an annulus surrounding said hub member and having one side thereof in rotating contact with the adjacent face of said abutment ring, said annulus being provided in its outer peripheral edge with lug accommodation notches registerable with said keeper notches, the inner edge portion of said annulus projecting into said raceway and having rotating contact with the adjacent face of said stop flange, and a plurality of anti-friction rollers located in the raceway and interposed between the inner surface of the annulus and adjacent periphery of said hub member, locking means carried by said annulus and cooperable with said abutment ring to retain the annulus in a fixed locking position, and a tire rim removably surrounding the notched outer periphery of said annulus and being provided with retention lugs cooperable with said clearance notches and keeper notches in the manner and for the purposes described.

ANDREW KENDZIERSKI.